(12) United States Patent
Lee et al.

(10) Patent No.: US 11,319,874 B1
(45) Date of Patent: May 3, 2022

(54) AIR SUPPLYING APPARATUS AND METHOD OF HYBRID POWER GENERATION EQUIPMENT

(71) Applicant: DOOSAN HEAVY INDUSTRIES & CONSTRUCTION CO., LTD., Changwon (KR)

(72) Inventors: Byoung-Hwa Lee, Busan (KR); SangPil Jo, Sejong (KR); Kyoung Taek Oh, Changwon (KR); Gab Jun Choi, Busan (KR)

(*) Notice: Subject to any disclaimer, the term of this patent is extended or adjusted under 35 U.S.C. 154(b) by 0 days.

(21) Appl. No.: 17/120,200

(22) Filed: Dec. 13, 2020

(30) Foreign Application Priority Data

Oct. 30, 2020 (KR) .......................... 10-2020-0143274
Dec. 2, 2020 (KR) .......................... 10-2020-0166652

(51) Int. Cl.
| | | |
|---|---|---|
| *F02C 6/10* | (2006.01) | |
| *F01K 23/10* | (2006.01) | |
| *F01K 21/04* | (2006.01) | |
| *F02C 6/18* | (2006.01) | |

(Continued)

(52) U.S. Cl.
CPC .............. *F02C 6/10* (2013.01); *F01K 21/047* (2013.01); *F01K 23/101* (2013.01); *F01K 23/103* (2013.01); *F02C 6/18* (2013.01); *F22B 1/1815* (2013.01); *F22B 1/1861* (2013.01); *F22B 35/001* (2013.01)

(58) Field of Classification Search
CPC .. F02C 6/10; F02C 6/18; F01K 21/047; F01K 23/10; F01K 23/101; F01K 23/103; F01K 23/106; F01K 23/108; F01K 23/065; F22B 1/1815; F22B 1/1861; F22B 35/001; F22B 35/007; F23K 2201/1006
See application file for complete search history.

(56) References Cited

U.S. PATENT DOCUMENTS 3,127,744 A * 4/1964 Nettel ................... F01K 23/103
60/672
4,852,344 A * 8/1989 Warner ................... F01K 3/247
60/648

(Continued)

OTHER PUBLICATIONS

Mita, T. et al "Trial Operation Results of the Fully-Fired Combined Cycle Generating Plants in Chita." ASME 1995 International Gas Turbine and Aeroengine Congress and Exposition. vol. 4. Houston, Texas, USA. 1995. V004T10A018. ASME. https://doi.org/10.1115/95-GT-333 (Year: 1995).*

*Primary Examiner* — Alain Chau
(74) *Attorney, Agent, or Firm* — Harvest IP Law, LLP (57) ABSTRACT

Disclosed are an air supply device and an air supply method for a hybrid power generation facility in which a gas turbine compresses air introduced from an outside, mixes the compressed air with fuel, and burns a mixture of the compressed air and the fuel to produce combustion gas. The air supply device includes a mixing chamber configured to selectively receive the combustion gas from the gas turbine, an air preheater configured to supply air to the mixing chamber, a burner configured to burn a fluid supplied from the mixing chamber, a first over-firing air supplier configured to receive a fluid from the gas turbine or the air preheater, a first pipeline connecting the gas turbine and the mixing chamber, and a second pipeline connecting the gas turbine and the first over-firing air supplier.

15 Claims, 5 Drawing Sheets

(51) Int. Cl.
*F22B 35/00* (2006.01)
*F22B 1/18* (2006.01)

(56) References Cited

U.S. PATENT DOCUMENTS

| | | | | |
|---|---|---|---|---|
| 5,365,730 | A * | 11/1994 | Bruckner | F01K 23/103 122/7 B |
| 5,367,870 | A * | 11/1994 | Vollmer | F01K 23/103 60/39.182 |
| 5,440,871 | A * | 8/1995 | Dietz | F01K 21/047 60/39.12 |
| 6,957,540 | B1 * | 10/2005 | Briesch | F02C 6/18 60/39.181 |
| 10,393,018 | B2 * | 8/2019 | Wu | F02C 6/18 |
| 10,954,854 | B2 * | 3/2021 | Wu | F22B 35/001 |
| 2005/0241289 | A1 * | 11/2005 | Briesch | F02C 6/18 60/39.182 |
| 2006/0008757 | A1 * | 1/2006 | Zamansky | F23G 7/07 432/18 |
| 2017/0350319 | A1 * | 12/2017 | Wu | F01D 15/10 |
| 2020/0011242 | A1 * | 1/2020 | Wu | F01K 23/10 |

\* cited by examiner

Fig. 1

Related Art

AIR SUPPLYING APPARATUS AND METHOD OF HYBRID POWER GENERATION EQUIPMENT

CROSS REFERENCE TO RELATED APPLICATIONS

This application claims priority to Korean Patent Application No. 10-2020-0143274, filed on Oct. 30, 2020 and Korean Patent Application No. 10-2020-0166652, filed on Dec. 2, 2020, the disclosures of which are incorporated herein by reference in their entireties.

BACKGROUND

1. Field

The present disclosure relates to an air supply device and an air supply method for a hybrid power generation facility, and more particularly, to an air supply device and an air supply method for a hybrid power generation facility that generates electric power by using driving force generated from a gas turbine and a steam turbine, and the device and method for supplying air to each part of the facility.

2. Description of the Related Art

There are various types of power plants depending on fuel used. A thermal power plant heats water in a boiler using thermal energy generated by burning fuel such as coal, heavy oil, and natural gas, and passes a high temperature and high pressure superheated steam produced through a steam turbine so that a generator connected to the steam turbine generates electricity.

The thermal power plant further includes main equipment and balance of plant (BOP) systems. The BOP systems include, for example, a fuel supply system, a fuel treatment system, a condensate and water supply system, a cooling water system, a reprocessing system, and auxiliary systems such as air treatment system, water treatment system, service water treatment system, and waste water treatment system. The main equipment and BOP systems play their roles in electricity production.

On the other hand, a combined cycle power plant is a power plant that combines a primary power generation cycle in which a gas turbine is driven with fuel such as natural gas or diesel and a secondary power generation cycle in which a steam turbine is driven with steam generated by passing the heat of exhaust gas discharged from the gas turbine through a heat recovery steam generator (HRSG). The combined cycle power plant has the advantage of 10% higher thermal efficiency, less pollution, and shorter resting time than conventional thermal power plants.

Figure 1:
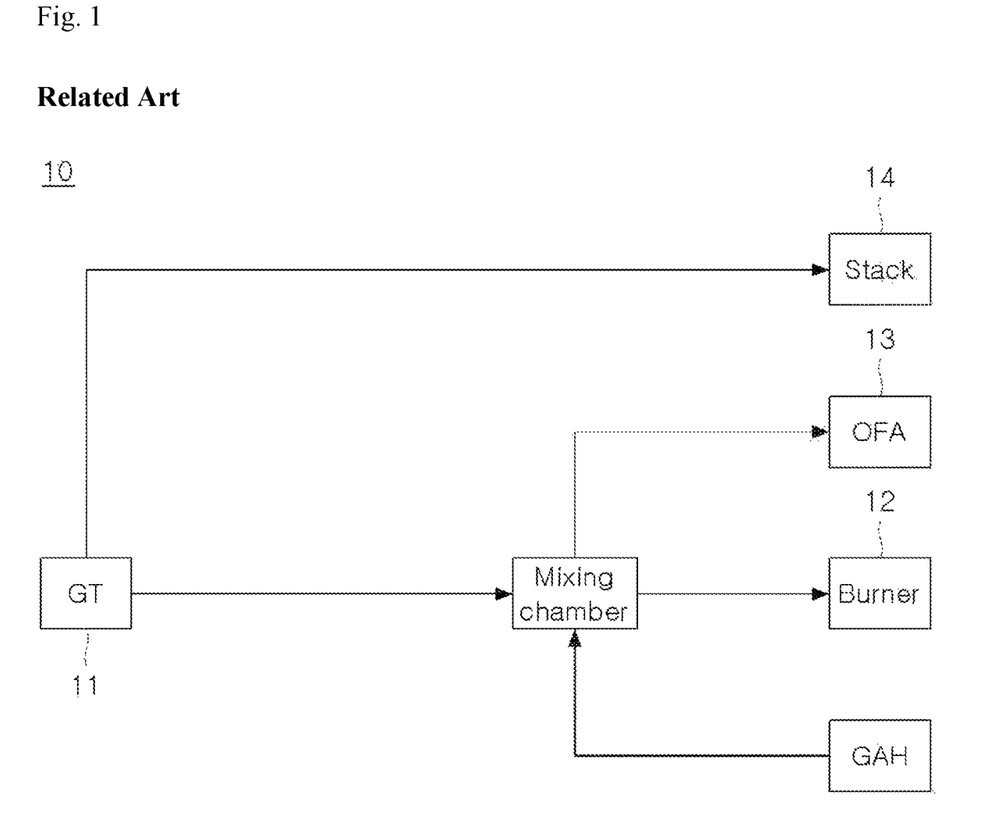
FIG. 1 is a diagram of an air supply device of a hybrid power generation facility according to a related art.

Referring to FIG. 1, an air supply device 10 of a conventional hybrid power generation facility supplies an air-fuel mixture to a burner 12 and an over-firing air (OFA) system 13 regardless of whether combustion gas generated from the gas turbine 11 is input to the facility, in which the fuel-air mixture supplied to the burner 12 and the fuel-air mixture supplied to the over-fire air system 13 have the same oxygen concentration. In the air supply device 10 of the conventional hybrid power generation facility, an oxygen concentration range of the fuel-air mixture required for the burner 12 is limited to ensure combustion stability. Therefore, the amount of combustion gas input to the burner 12 is limited, and the excess combustion gas is discharged to the outside through a stack 14. For this reason, there is a problem that the overall operation efficiency of the facility is reduced. In addition, in a case of using the conventional air supply device 10 of the hybrid power generation facility, the flow rate of fluid supplied to the over-fire air system 13 is reduced when the combustion gas is not input. Therefore, a penetration effect decreases, and thus the amount of pollutant generated from the facility increases.

SUMMARY

The present disclosure has been made in view of the problems occurring in the related art, and an objective of the present disclosure is to provide an air supply device and an air supply method for a hybrid power generation facility, the device and method capable of adjusting the flow rate of combustion gas supplied to a mixing chamber and an over-fire air system according to the purpose, improving the efficiency of the facility, and reducing pollutant.

According to an aspect of the present disclosure, there is provided an air supply device of a hybrid power generation facility in which a gas turbine compresses air introduced from an outside, mixes the compressed air with fuel, and burns a mixture of the compressed air and the fuel to produce combustion gas, the air supply device including: a mixing chamber configured to selectively receive the combustion gas from the gas turbine; an air preheater configured to supply air to the mixing chamber; a burner configured to burn a fluid supplied from the mixing chamber; a first over-firing air supplier configured to receive a fluid from the gas turbine or the air preheater; a first pipeline connecting the gas turbine and the mixing chamber; and a second pipeline connecting the gas turbine and the first over-firing air supplier.

The second pipeline may be branched from the first pipeline and connected to the first over-firing air supplier.

The air supply device may further include: a third pipeline connecting the air preheater and the mixing chamber; and a fourth pipeline branched from the third pipeline and connected to the second pipeline.

The air supply device may further include: a second over-firing air supplier configured to selectively receive the combustion gas from the gas turbine; and a fifth pipeline branched from the second pipeline and connected to the second over-firing air supplier.

In a first mode, under a non-operation of the gas turbine, air may be supplied from the air preheater to the mixing chamber through the third pipeline, and air may be supplied from the air preheater to the first over-firing air supplier through the fourth pipeline.

The air supply device may further include: a second over-firing air supplier configured to selectively receive the combustion gas from the gas turbine; a fifth pipeline branched from the second pipeline and connected to the second over-firing air supplier; and a third damper installed in the fourth pipeline and configured to selectively open and close the fourth pipeline. In a second mode, the combustion gas may be supplied to the mixing chamber, the first over-firing air supplier, and the second over-firing air supplier through the first pipeline, the second pipeline, and the fifth pipeline, respectively, the third damper may close the fourth pipeline, and the air preheater may supply air to the mixing chamber through the third pipeline.

The air supply device may further include: a second over-firing air supplier configured to selectively receive the combustion gas from the gas turbine; a fifth pipeline branched from the second pipeline and connected to the second over-firing air supplier; a second damper installed in the first pipeline and configured to selectively open and close the first pipeline; and a third damper installed in the fourth pipeline and configured to selectively open and close the fourth pipeline. In a third mode, the second damper may close the first pipeline, the combustion gas may be supplied from the gas turbine to the first over-firing air supplier and the second over-firing air supplier through the second pipeline and the fifth pipeline, respectively, the third damper may close the fourth pipeline, and the air preheater may supply air to the mixing chamber through the third pipeline.

The air supply device may further include: a second damper installed in the first pipeline to selectively open and close the first pipeline; and a temperature sensor installed at an outlet of the mixing chamber and configured to measure a temperature of fluid supplied to the burner. In the second mode, the second damper may adjust an opening thereof so that a temperature measured by the temperature sensor becomes equal to or lower than a preset reference temperature.

The air supply device may further include an oxygen sensor installed in the mixing chamber and configured to measure a concentration of oxygen of the mixing chamber. In the second mode, the second damper may primarily adjust the opening thereof such that the temperature measured by the temperature sensor becomes equal to or lower than the preset reference temperature and secondarily adjust the opening thereof such that the oxygen concentration measured by the oxygen sensor becomes equal to higher than a preset reference oxygen concentration.

The air supply device may further include a first damper installed in the fifth pipeline and configured to selectively open and close the fifth pipeline. In the second mode, the first damper may adjust an opening thereof to control a flow rate of the combustion gas supplied to the first over-firing air supplier and the second over-firing air supplier.

According to another aspect of the present disclosure, there is provided an air supply method for a hybrid power generation facility including a mixing chamber configured to selectively receive combustion gas from a gas turbine that compresses air introduced from an outside, mixes the compressed air with fuel, and burns a mixture of the compressed air and the fuel to produce the combustion gas, an air preheater configured to supply air to the mixing chamber, a burner configured to burn a fluid supplied from the mixing chamber, a first over-firing air supplier configured to receive a fluid from the gas turbine or the air preheater, a first pipeline connecting the gas turbine and the mixing chamber, and a second pipeline connecting the gas turbine and the first over-firing air supplier, the method including: adjusting a flow rate of the combustion gas flowing through the first pipeline and the second pipeline according to an oxygen concentration in the mixing chamber.

In the method, the hybrid power generation facility may further include a third pipeline connecting the air preheater and the mixing chamber and a fourth pipeline branched from the third pipeline and connected to the second pipeline. In a first mode, under a non-operation of the gas turbine, air may be supplied from the air preheater to the mixing chamber through the third pipeline, and air may be supplied from the air preheater to the first over-firing air supplier through the fourth pipeline.

In the method, the hybrid power generation facility may further include a third pipeline connecting the air preheater and the mixing chamber; a fourth pipeline branched from the third pipeline and connected to the second pipeline, a second over-firing air supplier configured to selectively receive the combustion gas from the gas turbine, a fifth pipeline branched from the second pipeline and connected to the second over-firing air supplier, and a third damper installed in the fourth pipeline and configured to selectively open and close the fourth pipeline. In a second mode, the combustion gas may be supplied to the mixing chamber, the first over-firing air supplier, and the second over-firing air supplier through the first pipeline, the second pipeline, and the fifth pipeline, respectively, the third damper may close the fourth pipeline, and the air preheater may supply air to the mixing chamber through the third pipeline.

In the method, the hybrid power generation facility may further include a third pipeline connecting the air preheater and the mixing chamber, a fourth pipeline branched from the third pipeline and connected to the second pipeline, a second over-firing air supplier configured to selectively receive the combustion gas from the gas turbine, a fifth pipeline branched from the second pipeline and connected to the second over-firing air supplier, and a third damper installed in the fourth pipeline and configured to selectively open and close the fourth pipeline. In a third mode, the second damper may close the first pipeline, the combustion gas may be supplied from the gas turbine to the first over-firing air supplier and the second over-firing air supplier through the second pipeline and the fifth pipeline, respectively, the third damper may close the fourth pipeline, and the air preheater may supply air to the mixing chamber through the third pipeline.

In the method, the hybrid power generation facility may further include a second damper installed in the first pipeline to selectively open and close the first pipeline, and a temperature sensor installed at an outlet of the mixing chamber and configured to measure a temperature of fluid supplied to the burner. In the second mode, the second damper may adjust an opening thereof so that a temperature measured by the temperature sensor becomes equal to or lower than a preset reference temperature.

In the method, the hybrid power generation facility may further include an oxygen sensor installed in the mixing chamber and configured to measure an oxygen concentration of the mixing chamber. In the second mode, the second damper may primarily adjust the opening thereof such that the temperature measured by the temperature sensor becomes equal to or lower than the preset reference temperature and secondarily adjust the opening thereof such that the oxygen concentration measured by the oxygen sensor becomes equal to higher than a preset reference oxygen concentration.

In the method, the hybrid power generation facility may further include a first damper installed in the fifth pipeline and configured to selectively open and close the fifth pipeline. In the second mode, the first damper may adjust an opening thereof to control a flow rate of the combustion gas supplied to the first over-firing air supplier and the second over-firing air supplier.

In the air supply device and the air supply method for a hybrid power generation facility according to the present disclosure, the device includes the first pipeline connecting the gas turbine and the mixing chamber and the second pipeline branched from the first pipeline to supply air to the first over-firing air supplier.

In combustion gas-air mixed operation mode (i.e., in the second mode) in which both the gas turbine and the air preheater operate, the flow rate of the combustion gas flowing through the first pipeline and the second pipeline is adjusted so that the oxygen concentration in the mixing chamber maintains a minimum necessary level at which combustion is possible. Through this, the overall operation efficiency of the facility can be improved. According to the present disclosure, in pure air operation mode (i.e., in the first mode) in which the gas turbine does not operate, air is supplied only to the first over-firing air supplier. Therefore, the penetration effect in the first over-firing air supplier is improved, and emissions of pollutant are reduced.

DETAILED DESCRIPTION OF THE DISCLOSURE

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

A hybrid power generation facility is a power plant that performs complex power generation using a gas turbine and a steam turbine that use natural gas and coal as fuel, respectively. The gas turbine compresses air introduced from the outside and burns a mixture of the compressed air and natural gas. To this end, the gas turbine includes a compressor, a combustor, and a turbine. The compressor compresses the air introduced from the outside. The combustor mixes the compressed air supplied from the compressor with fuel and burns the air-fuel mixture. The turbine generates a mechanical force required for generation of electric power using first combustion gas discharged from the combustor. The steam turbine generates a mechanical force required for generation of electric power using hot steam generated by evaporating water using thermal energy generated through the combustion of fuel.

Figure 2:
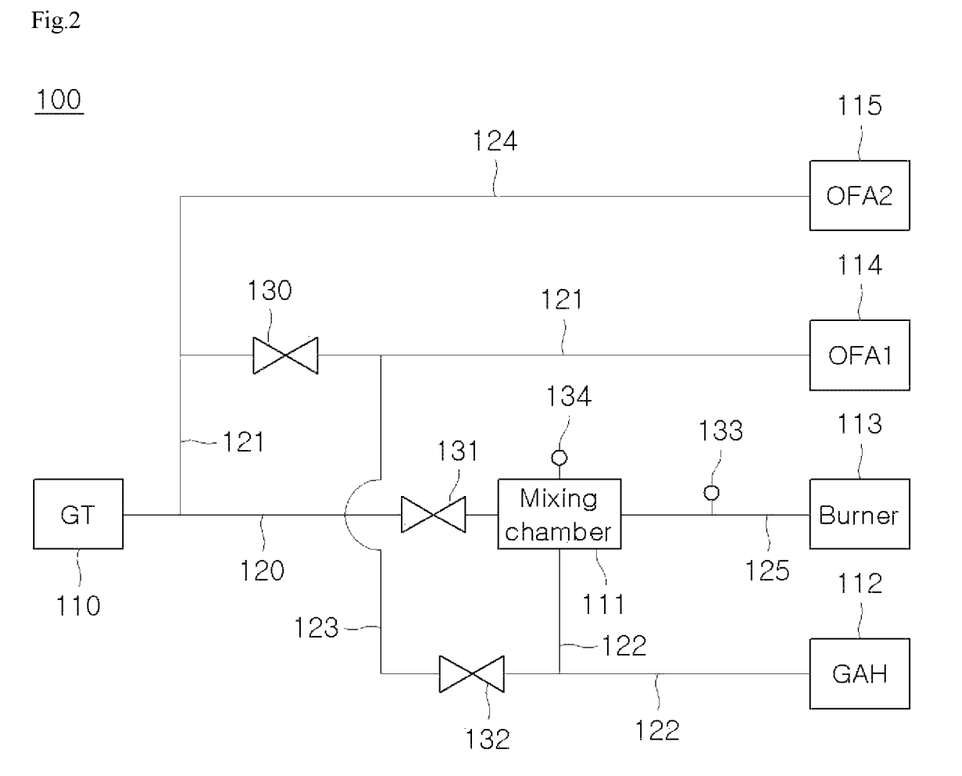
FIG. 2 is a diagram illustrating a hybrid power generation facility according to an exemplary embodiment.

Referring to FIG. 2, an air supply device 100 of a hybrid power generation facility according to an exemplary embodiment is a device for supplying air and combustion gas in the hybrid power generation facility. The air supply device 100 includes a mixing chamber 111, an air preheater 112, a burner 113, a first over-fire air supplier 114, a second over-fire air supplier 115, a first pipeline 120, a second pipeline 121, a third pipeline 122, a fourth pipeline 123, a fifth pipeline 124, a sixth pipeline 125, a first damper 130, a second damper 131, a third damper 132, a temperature sensor 133, and an oxygen sensor 134.

The mixing chamber 111 selectively receives first combustion gas from the gas turbine 110, and mixes the air supplied from the air preheater 112 with the first combustion gas.

The air preheater 112 called a gas-air heater (GAH) supplies air to the mixing chamber 111. When the second combustion gas generated and discharged from a boiler (not illustrated) passes through the air preheater 112, the air passing through the air preheater 112 is heated by heat exchange with the second combustion gas.

The burner 113 installed in the boiler burns a mixture of the first combustion gas, air, and fuel (for example, coal), or a mixture of air and fuel. Steam is generated by heating water with thermal energy generated during the combustion operation of the burner 113, and the generated steam passes through the steam turbine (not illustrated) to generate a mechanical force used for generation of electric power.

The first over-firing air supplier 114 receives fluid from the gas turbine 110 or the air preheater 112 and supplies over-firing air (OFA) to the boiler. The second over-firing air supplier 115 receives fluid from the gas turbine 110.

The first pipeline 120 connects the gas turbine 110 and the mixing chamber 111. The second pipeline 121 connects the gas turbine 110 and the first over-firing air supplier 114. The second pipeline 121 is branched from the first pipeline 120 and is connected to the first over-firing supplier 114. The third pipeline 122 connects the air preheater 112 and the mixing chamber 111. The fourth pipeline 123 is branched from the third pipeline 122 and is connected to the second pipeline 121. The fifth pipeline 124 is branched from the second pipeline 121 and is connected to the second over-firing air supplier 115. The sixth pipeline 125 connects the mixing chamber 111 and the burner 113.

The first damper 130 is installed in the second pipeline 121 and selectively opens and closes the second pipeline 121. The second damper 131 is installed in the first pipeline 120 and selectively opens and closes the first pipeline 120. The third damper 132 is installed in the fourth pipeline 123 and selectively opens and closes the fourth pipeline 123.

The temperature sensor 133 is installed in the sixth pipeline 125 to measure the temperature of the mixture at an outlet of the mixing chamber 111. The oxygen sensor 134 is installed in the mixing chamber 111 to measure the concentration of oxygen of the mixing chamber 111.

Figure 3:
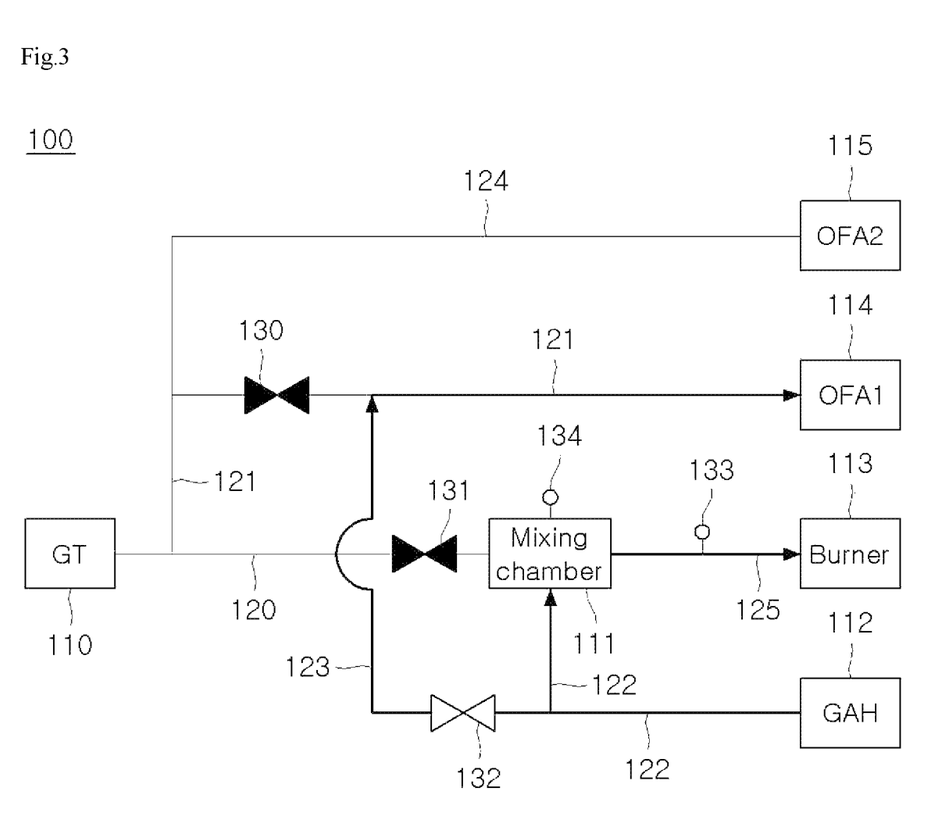
FIG. 3 is a diagram illustrating an operation in first mode of the air supply device of the hybrid power generation facility illustrated in FIG. 2.

Referring to FIG. 3, in first mode (referred to as pure air operation mode) of the present disclosure, the gas turbine 110 and the second over-firing air supplier 115 do not operate, and the first damper 130 and the second damper 131 are closed. Therefore, the first combustion gas does not flow through the first pipeline 120, the second pipeline 121, and the fifth pipeline 124. In the first mode, a portion of air is supplied from the air preheater 112 to the mixing chamber 111 through the third pipeline 122, and the remaining air is supplied from the air preheater 112 to the first over-firing air supplier 114 12 through the fourth pipeline 123. Here, coal fuel is separately supplied to the mixing chamber 111. The mixing chamber 111 mixes fuel and air and supplies the mixture to the burner 113 through the sixth pipeline 125.

The first mode is an operation mode in which the facility operates under a condition of minimum load. In the first mode, air is supplied only to the first over-firing air supplier 114 and not to the second over-firing air supplier 115, so that the penetration effect of the first over-firing air supplier 114 is improved.

Figure 4:
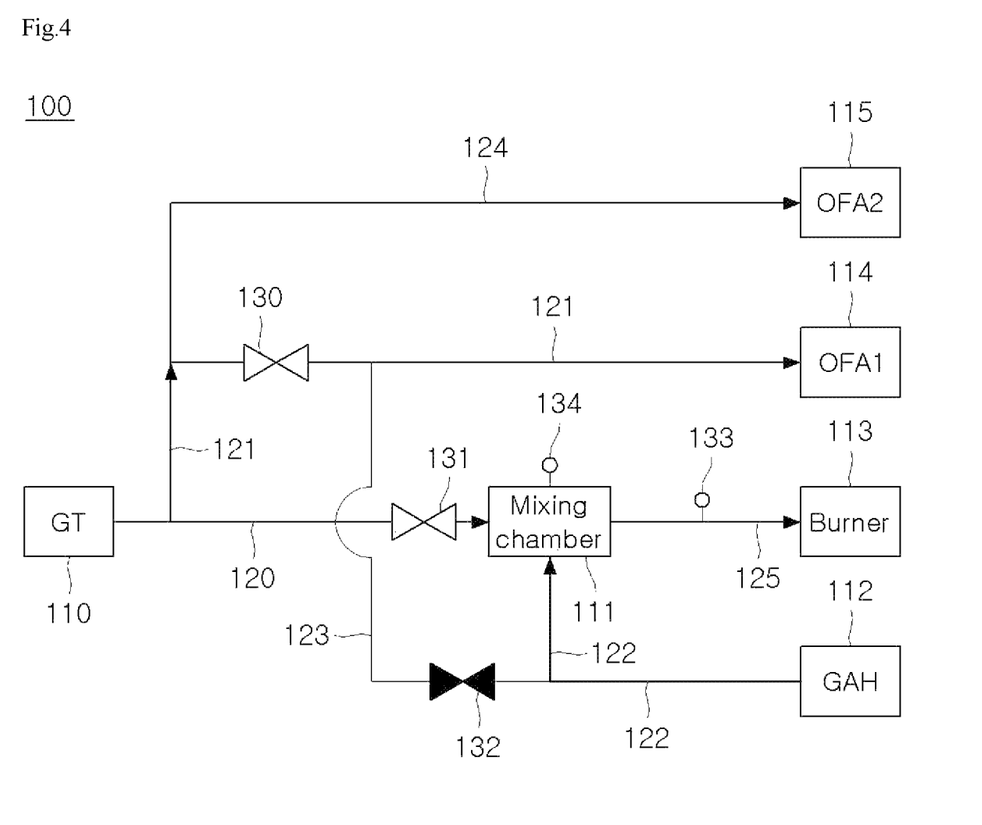
FIG. 4 is a diagram illustrating an operation in second mode of the air supply device of the hybrid power generation facility illustrated in FIG. 2.

Referring to FIG. 4, in second mode (referred to as combustion gas-air mixed operation mode) of the present disclosure, the first combustion gas is supplied from the gas turbine 110 to the mixing chamber 111, the first over-firing air supplier 114, and the second over-firing air supplier 115 through the first pipeline 120, the second pipeline 121, and the fifth pipeline 124. In addition, the third damper 132 closes the fourth pipeline 123, and the air preheater 112 supplies air to the mixing chamber 111 through the third pipeline 122.

The second mode is an operation mode in which the facility operates under a condition of maximum load. In the second mode, at least an energy storage system (ESS) or a carbon capture and storage system (CCS) is used.

In the second mode, the second damper 131 adjusts the opening thereof so that the temperature measured by the temperature sensor 133 becomes equal to or lower than a preset reference temperature. In further detail, in the second mode, the second damper 131 primarily adjusts the opening thereof so that the temperature measured by the temperature sensor 133 becomes equal to or lower than a preset reference temperature, and then secondarily adjusts the opening thereof so that the oxygen concentration measured by the oxygen sensor 134 becomes equal to or higher than a preset reference concentration (for example, 13%). The first damper 130 controls the flow rate of the first combustion gas supplied to the first over-firing air supplier 114 and the second over-firing air supplier 115 by adjusting the opening thereof.

According to an exemplary embodiment, in the second mode, the flow rate of the first combustion gas flowing through the first pipeline 120 and the second pipeline 121 is adjusted such that the oxygen concentration in the mixing chamber 111 maintains a level at which combustion is possible. This improves the overall operation efficiency of the facility.

Figure 5:
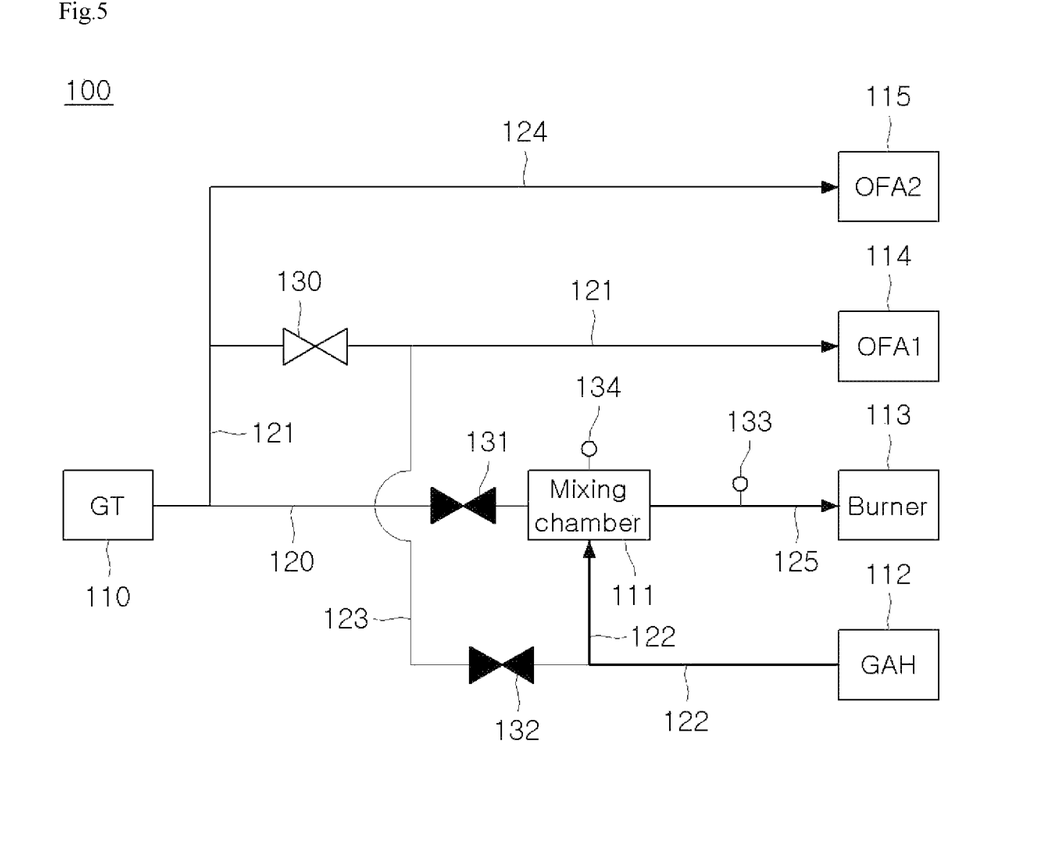
FIG. 5 is a diagram illustrating an operation in third mode of the air supply device of the hybrid power generation facility illustrated in FIG. 2.

Referring to FIG. 5, in third mode of the present disclosure, the second damper 131 closes the first pipeline 120, and the first combustion gas is supplied from the gas turbine 110 to the first over-firing air supplier 114 and the second over-firing air supplier 115 through the second pipeline 121 and the fifth pipeline 124. In the third mode, the third damper 132 closes the fourth pipeline 123, and the air preheater 112 supplies air to the mixing chamber 111 through the third pipeline 122.

The third mode is an operating condition in which the gas turbine 110 performs a fast start-up under a maximum load of the boiler or the steam turbine. This is because conditions (e.g., flow rate, oxygen concentration, and temperature) of the first combustion gas discharged from the gas turbine 110 rapidly change. Therefore, only pure air is introduced into the burner 113, and the total amount of the first combustion gas discharged from the gas turbine 110 is supplied to the first over-firing air supplier 114 and the second over-firing air supplier 115.

However, the operation described above is only an initial operation in the third mode. If the load of the gas turbine 110 exceeds a preset reference load value, the second damper 131 is opened and the first combustion gas is supplied to the mixing chamber 111 and the burner 113 through the first pipeline 120. In the third mode, the third damper 132 is opened to provide a predetermined amount of air to the first over-firing air supplier 114, if necessary.

What is claimed is:

1. An air supply device of a hybrid power generation facility in which a gas turbine compresses air introduced from an outside, mixes the compressed air with fuel, and burns a mixture of the compressed air and the fuel to produce combustion gas, the air supply device comprising:
   a mixing chamber configured to selectively receive the combustion gas from the gas turbine;
   an air preheater configured to supply air to the mixing chamber;
   a burner configured to burn a fluid supplied from the mixing chamber;
   a first over-firing air supplier configured to receive a fluid from the gas turbine or the air preheater;
   a second over-firing air supplier configured to selectively receive the combustion gas from the gas turbine;
   a first pipeline connecting the gas turbine and the mixing chamber;
   a second pipeline connecting the gas turbine and the first over-firing air supplier;
   a third pipeline connecting the air preheater and the mixing chamber;
   a fourth pipeline branched from the third pipeline and connected to the second pipeline to connect the air preheater and the first over-firing air supplier;
   a fifth pipeline branched from the second pipeline and connected to the second over-firing air supplier; and
   a third damper installed in the fourth pipeline and configured to selectively open and close the fourth pipeline,
   wherein in response to determining that the gas turbine performs combustion gas-air mixed operation, the gas turbine is configured to supply the combustion gas to the mixing chamber, the first over-firing air supplier, and the second over-firing air supplier through the first pipeline, the second pipeline, and the fifth pipeline, respectively, and the air preheater is configured to supply air to the mixing chamber through the third pipeline and close the fourth pipeline with the third damper to not supply air to the first over-firing air supplier.

2. The air supply device according to claim 1, wherein the second pipeline is branched from the first pipeline and is connected to the first over-firing air supplier.

3. The air supply device according to claim 1, wherein in response to determining that the gas turbine performs pure air operation, the air preheater is configured to supply air to the mixing chamber through the third pipeline, and to supply air to the first over-firing air supplier through the fourth pipeline.

4. The air supply device according to claim 3,
   wherein in response to determining that the gas turbine performs pure air operation, air is supplied only to the first over-firing air supplier through the fourth pipeline and not to the second over-firing air supplier to improve a penetration effect of the first over-firing air supplier.

5. The air supply device according to claim 1, further comprising:
   a second damper installed in the first pipeline to selectively open and close the first pipeline; and
   a temperature sensor installed at an outlet of the mixing chamber and configured to measure a temperature of fluid supplied to the burner,
   wherein in response to determining that the gas turbine performs combustion gas-air mixed operation, the second damper adjusts an opening thereof so that a temperature measured by the temperature sensor becomes equal to or lower than a preset reference temperature.

6. The air supply device according to claim 5, further comprising an oxygen sensor installed in the mixing chamber and configured to measure a concentration of oxygen of the mixing chamber, wherein in response to determining that the gas turbine performs combustion gas-air mixed operation, the second damper primarily adjusts the opening thereof such that the temperature measured by the temperature sensor becomes equal to or lower than the preset reference temperature and secondarily adjusts the opening thereof such that the oxygen concentration measured by the oxygen sensor becomes equal to higher than a preset reference oxygen concentration.

7. The air supply device according to claim 6, wherein in response to determining that the gas turbine performs combustion gas-air mixed operation, the flow rate of the combustion gas flowing through the first pipeline and the second pipeline is adjusted such that the oxygen concentration in the mixing chamber maintains a level at which combustion in the burner is possible.

8. The air supply device according to claim 1, further comprising a first damper installed in the fifth pipeline and configured to selectively open and close the fifth pipeline, wherein in response to determining that the gas turbine performs combustion gas-air mixed operation, the first damper adjusts an opening thereof to control a flow rate of the combustion gas supplied to the first over-firing air supplier and the second over-firing air supplier.

9. The air supply device according to claim 1, further comprising:

a second damper installed in the first pipeline and configured to selectively open and close the first pipeline; and wherein in response to determining that the gas turbine performs fast start-up, the second damper closes the first pipeline, the gas turbine is configured to supply the combustion gas to the first over-firing air supplier and the second over-firing air supplier through the second pipeline and the fifth pipeline, respectively, and close the first pipeline with the second damper to not supply the combustion gas to the mixing chamber, and the air preheater is configured to supply air to the mixing chamber through the third pipeline and close the fourth pipeline with the third damper to not supply air to the first over-firing air supplier.

10. An air supply method for a hybrid power generation facility including a mixing chamber configured to selectively receive combustion gas from a gas turbine that compresses air introduced from an outside, mixes the compressed air with fuel, and burns a mixture of the compressed air and the fuel to produce the combustion gas, an air preheater configured to supply air to the mixing chamber, a burner configured to burn a fluid supplied from the mixing chamber, a first over-firing air supplier configured to receive a fluid from the gas turbine or the air preheater, a first pipeline connecting the gas turbine and the mixing chamber, and a second pipeline connecting the gas turbine and the first over-firing air supplier, the method comprising:

adjusting a flow rate of the combustion gas flowing through the first pipeline and the second pipeline according to an oxygen concentration in the mixing chamber, wherein the hybrid power generation facility further comprises a third pipeline connecting the air preheater and the mixing chamber, a fourth pipeline branched from the third pipeline and connected to the second pipeline to connect the air preheater and the first over-firing air supplier, a second over-firing air supplier configured to selectively receive the combustion gas from the gas turbine, a fifth pipeline branched from the second pipeline and connected to the second over-firing air supplier, and a third damper installed in the fourth pipeline and configured to selectively open and close the fourth pipeline, and wherein in a second mode, the combustion gas is supplied to the mixing chamber, the first over-firing air supplier, and the second over-firing air supplier through the first pipeline, the second pipeline, and the fifth pipeline, respectively, the third damper closes the fourth pipeline, and the air preheater supplies air to the mixing chamber through the third pipeline.

11. The method according to claim 10, wherein in a first mode, under a non-operation of the gas turbine, air is supplied from the air preheater to the mixing chamber through the third pipeline, and air is supplied from the air preheater to the first over-firing air supplier through the fourth pipeline.

12. The method according to claim 10, wherein the hybrid power generation facility further comprises a second damper installed in the first pipeline to selectively open and close the first pipeline, and a temperature sensor installed at an outlet of the mixing chamber and configured to measure a temperature of fluid supplied to the burner, and wherein in the second mode, the second damper adjusts an opening thereof so that a temperature measured by the temperature sensor becomes equal to or lower than a preset reference temperature.

13. The method according to claim 12, wherein the hybrid power generation facility further comprises an oxygen sensor installed in the mixing chamber and configured to measure an oxygen concentration of the mixing chamber, and wherein in the second mode, the second damper primarily adjusts the opening thereof such that the temperature measured by the temperature sensor becomes equal to or lower than the preset reference temperature and secondarily adjusts the opening thereof such that the oxygen concentration measured by the oxygen sensor becomes equal to higher than a preset reference oxygen concentration.

14. The method according to claim 10, wherein the hybrid power generation facility further comprises a first damper installed in the fifth pipeline and configured to selectively open and close the fifth pipeline, and wherein in the second mode, the first damper adjusts an opening thereof to control a flow rate of the combustion gas supplied to the first over-firing air supplier and the second over-firing air supplier.

15. The method according to claim 10, wherein in a third mode, the second damper closes the first pipeline, the combustion gas is supplied from the gas turbine to the first over-firing air supplier and the second over-firing air supplier through the second pipeline and the fifth pipeline, respectively, the third damper closes the fourth pipeline, and the air preheater supplies air to the mixing chamber through the third pipeline.

* * * * *